United States Patent
Wu

(10) Patent No.: US 12,393,322 B2
(45) Date of Patent: Aug. 19, 2025

(54) VIDEO DISPLAY METHOD AND APPARATUS, AND COMPUTER DEVICE AND STORAGE MEDIUM

(71) Applicant: Beijing Zitiao Network Technology Co., Ltd., Beijing (CN)

(72) Inventor: Jian Wu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/531,214

(22) Filed: Dec. 6, 2023

(65) Prior Publication Data

US 2024/0103697 A1 Mar. 28, 2024

Related U.S. Application Data

(63) Continuation of application No. PCT/CN2022/112922, filed on Aug. 17, 2022.

(30) Foreign Application Priority Data

Sep. 29, 2021 (CN) .......................... 202111151966.1

(51) Int. Cl.
G06F 3/0484 (2022.01)
G06F 3/0483 (2013.01)
G06F 3/16 (2006.01)

(52) U.S. Cl.
CPC .......... *G06F 3/0484* (2013.01); *G06F 3/0483* (2013.01); *G06F 3/165* (2013.01)

(58) Field of Classification Search
CPC ....... G06F 3/0484; G06F 3/0483; G06F 3/165
See application file for complete search history.

(56) References Cited

U.S. PATENT DOCUMENTS 8,571,863 B1 10/2013 Harb et al.
8,898,566 B1 * 11/2014 Rachabathuni ........... G06F 5/00
715/708

(Continued)

FOREIGN PATENT DOCUMENTS

CN 103905879 A 7/2014
CN 105744291 A 7/2016

(Continued)

OTHER PUBLICATIONS

Akhtar et al., "Audio-Visual Multimedia Quality Assessment: A Comprehensive Survey", IEEE Access, vol. 5, Sep. 11, 2017, 28 pages.

(Continued)

*Primary Examiner* — James T Tsai
(74) *Attorney, Agent, or Firm* — Astute IP Law Group

(57) ABSTRACT

A video display method and apparatus, and a computer device and a storage medium. The method includes: in response to a video play request for a target video, acquiring the target video and audio of associated statements which correspond to the target video, wherein the associated statements are extracted from a target book corresponding to the target video (101); playing the target video, and when a target segment in the target video is played, displaying an audio identifier (102); and in response to a trigger operation for the audio identifier, determining, from the associated statements, a target statement which corresponds to the target segment, and playing audio of the target statement while playing the target segment (103).

15 Claims, 2 Drawing Sheets

(56) References Cited

U.S. PATENT DOCUMENTS

| | | | |
|---|---|---|---|
| 12,300,242 B2* | 5/2025 | Cameron | G06F 3/165 |
| 2012/0054813 A1 | 3/2012 | Carmichael | |
| 2012/0245720 A1* | 9/2012 | Story, Jr. | G06F 3/04847 |
| | | | 700/94 |
| 2013/0307856 A1* | 11/2013 | Keane | G06F 3/011 |
| | | | 345/473 |
| 2015/0040006 A1 | 2/2015 | Gentile | |
| 2015/0046806 A1* | 2/2015 | Anderson | G06F 3/04842 |
| | | | 715/273 |
| 2015/0199091 A1* | 7/2015 | Bullock | G06F 3/04842 |
| | | | 715/776 |
| 2016/0048275 A1* | 2/2016 | Beavers | G06F 3/04847 |
| | | | 715/202 |
| 2016/0149864 A1* | 5/2016 | Flawn | G06F 16/93 |
| | | | 715/733 |
| 2016/0164814 A1* | 6/2016 | Landau | G06F 3/04817 |
| | | | 715/753 |
| 2018/0157657 A1 | 6/2018 | Li | |
| 2019/0146742 A1* | 5/2019 | Li | G06F 3/165 |
| | | | 345/11 |
| 2020/0058270 A1 | 2/2020 | Li et al. | |
| 2020/0293266 A1* | 9/2020 | German | G10L 13/08 |
| 2021/0012222 A1* | 1/2021 | Kim | G06F 40/30 |
| 2023/0229694 A1* | 7/2023 | Saito | G06F 3/0483 |
| | | | 715/234 |

FOREIGN PATENT DOCUMENTS

| | | |
|---|---|---|
| CN | 105847939 A | 8/2016 |
| CN | 107168934 A | 9/2017 |
| CN | 108597260 A | 9/2018 |
| CN | 109543102 A | 3/2019 |
| CN | 109977266 A | 7/2019 |
| CN | 109982129 A | 7/2019 |
| CN | 110248236 A | 9/2019 |
| CN | 111143610 A | 5/2020 |
| CN | 112153397 A | 12/2020 |
| CN | 113282789 A | 8/2021 |
| CN | 113286197 A | 8/2021 |
| CN | 113392273 A | 9/2021 |
| CN | 113763919 A | 12/2021 |
| JP | 2005026739 A | 1/2005 |

OTHER PUBLICATIONS

Xu, "The Link Structure and Mutual Benefit of Books+Short Videos", Research on Publishing and Distribution, Issue 3, Mar. 15, 2020, 6 pages.

Paiano et al., "EB2000: a Structured Approach to the creation of E-Books", IEEE Sixth International Symposium on Multimedia Software Engineering, Jan. 17, 2005, 7 pages.

International Search Report and Written Opinion for International Application No. PCT/CN2022/112922, mailed on Oct. 26, 2022, 17 Pages.

Leng, "Design and implementation of of the Client Software for Netease Media PLayer with Social Functions", A these Submitted to Southeast University for the Academic Degree of MAster of Engineering, Jun. 24, 2016, 63 pages, with English Abstract.

* cited by examiner

VIDEO DISPLAY METHOD AND APPARATUS, AND COMPUTER DEVICE AND STORAGE MEDIUM

The present application is a continuation of International Patent Application No. PCT/CN2022/112922, filed on Aug. 17, 2022 which claims the priority of Chinese Patent Application No. 202111151966.1, entitled "Video Display Method, Apparatus, Computer Device and Storage Medium" submitted with the China National Intellectual Property Administration (CHIPA) on Sep. 29, 2021, which is incorporated into the present application by reference in its entirety.

INVENTION FIELD

The present disclosure relates to the field of information processing technology, in particular to a video display method, apparatus, computer device and storage medium.

BACKGROUND

With the development of Internet, videos have become a very important part of people's entertainment. During viewing videos, users usually interact with the device to control the video being played, and how to enrich the interactive modes during viewing the videos has become an urgent problem to be solved.

SUMMARY OF THE INVENTION

Embodiments of the present disclosure at least provides a video display method, apparatus, computer device and storage medium.

In a first aspect, embodiments of the present disclosure provide a video display method, comprising:
  acquiring a target video and audios of associated sentences corresponding to the target video in response to a video play request for the target video; wherein the associated sentences are extracted from a target book corresponding to the target video;
  playing the target video and displaying an audio identification when a target segment of the target video is being played; and
  determining a target sentence corresponding to the target segment from the associated sentences in response to a trigger operation on the audio identification, and playing an audio of the target sentence while playing the target segment.
In a possible embodiment, the method further comprises:
  acquiring target comment information corresponding to the target sentence from comment information corresponding to the target book; and
  displaying the target comment information in manner of bullet comments while playing the target segment.
In a possible embodiment, the method further comprises:
  displaying the text content corresponding to the target sentence at a preset location while playing the target segment.
In a possible embodiment, the method further comprises:
  determining a display progress of the text content in the target book in response to a trigger operation on the text content; and
  skipping to display the target book in accordance with the display progress.
In a possible embodiment, the associated sentence is one with popularity information meeting preset conditions, which is extracted from a corresponding paragraph of the target book in accordance with popularity information corresponding to respective sentences, wherein the target segment has the same plot as that of the target sentence.
In a possible embodiment, the method further comprises:
  acquiring a topic information involving the target book;
  determining a first video segment with popularity information meeting a preset condition in the target video; and
  displaying the topic information while playing the first video segment in the target video.
In a possible embodiment, the method further comprises:
  acquiring at least one book circle information corresponding to the target book;
  when the target video is detected to meet display conditions for any book circle information in process of playing the target video, displaying the book circle information; and
  skipping to display a book circle corresponding to the triggered book circle information in response to a trigger operation on the displayed book circle information.
In a possible embodiment, the playing the target video comprises:
  playing the target video on a target page; and
  the method further comprises:
  prior to full screen playing of the target video on the target page, displaying a video identification of the target video at a first preset location on the target page and a plurality of other video identifications associated with the target video, and displaying a book identification or a book chapter identification associated with a video corresponding to the video identification at a respective location of each video identification on the target page.

In a second aspect, embodiments of the present disclosure provide a video display apparatus, comprising:
  an acquisition module for acquiring a target video and audios of associated sentences corresponding to the target video in response to a video play request for the target video; wherein the associated sentences are extracted from a target book corresponding to the target video;
  a display module for playing the target video and displaying an audio identification when a target segment of the target video is being played; and
  a play module for determining a target sentence corresponding to the target segment from the associated sentences in response to a trigger operation on the audio identification, and playing an audio of the target sentence while playing the target segment.
In a possible embodiment, the display module is further configured for:
  acquiring target comment information corresponding to the target sentence from comment information corresponding to the target book; and
  displaying the target comment information in manner of bullet comments while playing the target segment.
In a possible embodiment, the display module is further configured for:
  displaying the text content corresponding to the target sentence at a preset location while playing the target segment.
In a possible embodiment, the display module is further configured for:
  determining a display progress of the text content in the target book in response to a trigger operation on the text content; and skipping to display the target book in accordance with the display progress.

In a possible embodiment, the associated sentence is one with popularity information meeting preset conditions, which is extracted from a corresponding paragraph of the target book in accordance with popularity information corresponding to respective sentences, wherein the target segment has the same plot as that of the target sentence.

In a possible embodiment, the display module is further configured for:
acquiring a topic information involving the target book;
determining a first video segment with popularity information meeting a preset condition in the target video; and
displaying the topic information while playing the first video segment in the target video.

In a possible embodiment, the display module is further configured for:
acquiring at least one book circle information corresponding to the target book;
when the target video is detected to meet display conditions for any book circle information in process of playing the target video, displaying the book circle information; and
skipping to display a book circle corresponding to the triggered book circle information in response to a trigger operation on the displayed book circle information.

In a possible embodiment, the play module is further configured for:
playing the target video on a target page; and
the display module is further configured for:
prior to full screen playing of the target video on the target page, displaying a video identification of the target video at a first preset location on the target page and a plurality of other video identifications associated with the target video, and displaying a book identification or a book chapter identification associated with a video corresponding to the video identification at a respective location of each video identification on the target page.

In a third aspect, embodiments of the present disclosure provide a computer device, comprising: a processor, a memory and a bus, wherein the memory is stored with machine-readable instructions which are executable by the processor, the processor communicates with the memory via the bus when the computer device works, and when the machine-readable instructions are executed by the processor, the steps of the video display method of the first aspect, or any possible embodiments according to the first aspect, are executed.

In a fourth aspect, embodiments of the present disclosure provide s computer-readable storage medium, which is stored with computer programs, and the steps of the video display method of the first aspect, or any possible embodiments according to the first aspect, are executed when the computer programs are executed by the processor.

With the video display method, apparatus, computer device and storage medium provided in the present disclosure, an audio identification may be displayed when a target segment is being played during the target video playing, and a user may display an audio of a target sentence while playing the target segment by triggering the audio identification, and thereby achieving a linkage between the target video and a target book, enriching the interaction modes during the video playing, and helping the user to understand the artistic conception of scene of the target video segment and thus improving the user's viewing experience.

Further, the user's understanding about the target book can be improved, and then the user is guided to read the target book, and thereby increasing the read rate of books.

To make the above objectives, features and advantages of the present disclosure more obvious and easier to understand, hereinafter preferred examples are exemplified with reference to the accompanying, which are detailed as follows.

DESCRIPTION OF THE DRAWINGS

To clearly illustrate the technical solutions of the embodiments of the invention, hereinafter the drawings involved in the embodiments will be briefly described, wherein the drawings are incorporated into the description and constitute a part of the description, which illustrate the embodiments in compliance with the present disclosure, and used along with the description to describe the technical solutions of the disclosure. It should be understood that the accompanying drawings only illustrate some embodiments of the present disclosure, and thus should not be regarded as limitation of the scope. For persons of ordinary skills in the art, other related drawings can be obtained in accordance with creative works.

DETAILED DESCRIPTION OF THE INVENTION

Figure 1:
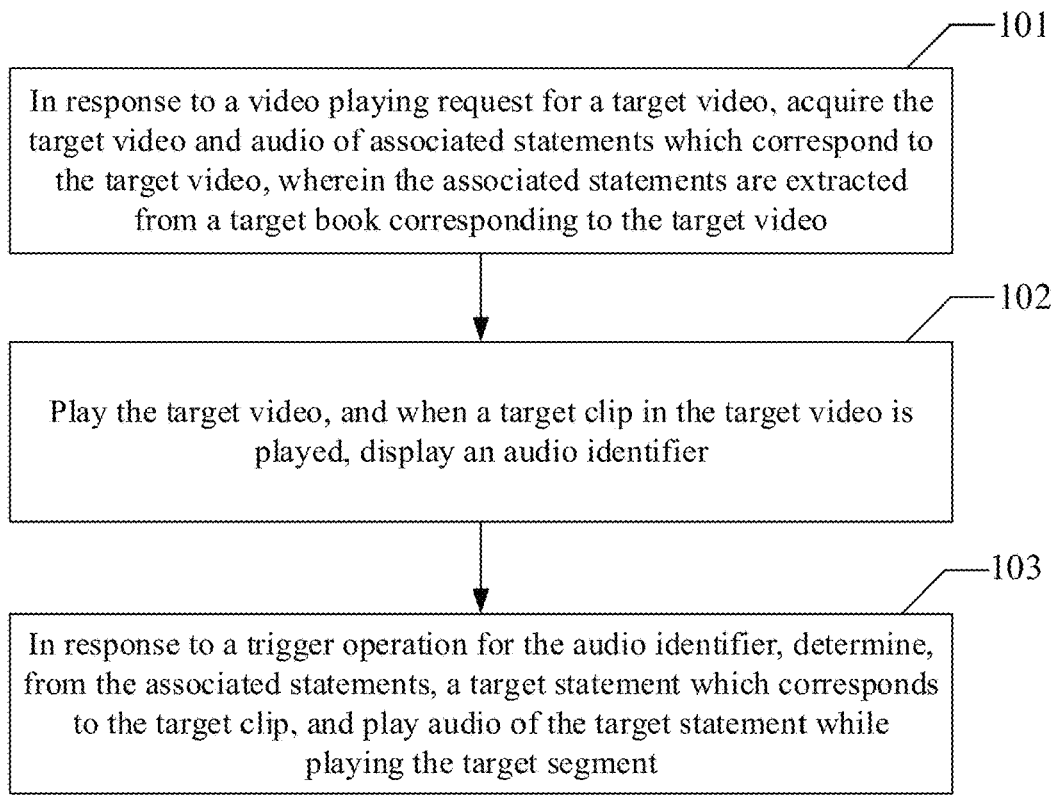
FIG. 1 shows a flowchart of a video display method provided in an embodiment of the present disclosure.

To make the objectives, technical solutions and advantages of the present invention clearer, hereinafter the technical solutions in the embodiments of the present invention will be clearly and completely described with reference to the accompanying drawings in the embodiments of the present invention. Clearly, the described embodiments are only some, but not all of the embodiments of the present disclosure. Generally, the components of the embodiments of the present disclosure described and illustrated in the drawings herein can be arranged and designed in various different configurations. Thus, the following detailed description of the embodiments of the present invention provided in the drawings is not intended to limit the scope sought to protect in the present disclosure, but merely represents the selected embodiments of the present disclosure. On the basis of the embodiments of the present disclosure, all other embodiments obtained by persons skilled in the art without creative effort fall within the scope of the present invention.

After research, it is found that during the video viewing, users usually interact with the device to control the video being played, and how to enrich the interactive modes during the video viewing has become an urgent problem to be solved.

Based on the above research, the present disclosure provides a video display method, apparatus, computer device and storage medium, in which an audio identification is displayed when a target segment is being played during the target video playing, and a user may display an audio of a target sentence while playing the target segment by triggering the audio identification, and thereby achieving a linkage between the target video and a target book, enriching the interaction modes during the video playing, and helping the user to understand the artistic conception of scene of the target video segment and then improving the user's viewing experience.

Further, the user's understanding about the target book can also be improved, and the user is guided to read the target book, thereby increasing the read rate of books.

The defects of the above solutions are all obtained by the inventor after practice and careful study, and hence the discovery process and the following solutions proposed to solve the problems in the present invention are all contributions made by the inventor in the process of the present disclosure.

It should be noted that similar reference signs and letters indicate similar items, and thus once a certain item is defined in a drawing, it does not need to be further defined and explained in subsequent drawings.

To facilitate the understanding of this embodiment, a video display method disclosed in the embodiment of the disclosure is introduced in detail. The executive subject of the video display method provided in the embodiment of the present disclosure is generally a terminal device with certain computing power, such as, smart phone, tablet computer, personal computer, and the like.

Referring to FIG. 1, which is a flowchart of a video display method provided in an embodiment of the present disclosure, the method comprises step 101 to step 103, wherein:

Step 101: acquiring the target video and an audio of an associated sentence corresponding to the target video in response to a video play request for a target video; wherein the associated sentence is extracted from a target book corresponding to the target video.

Step 102: playing the target video, and displaying an audio identification when a target segment of the target video is being played.

Step 103: determining a target sentence corresponding to the target segment from the associated sentence in response to a trigger operation on the audio identification, and playing an audio of the target sentence while playing the target segment.

In the above method, the audio identification may be displayed when the target segment is being played during the target video playing, and the user may display the audio of a target sentence while playing the target segment by triggering the audio identification, and thereby achieving a linkage between the target video and a target book, enriching the interaction modes during the video playing, and helping the user to understand the artistic conception of scene of the target video segment and improving the user's viewing experience.

Further, the user's understanding about the target book can be improved, and the user can be guided to read the target book, thereby increasing the read rate of books.

The following is a detailed description of the above steps.

In a possible embodiment, if a target video is made based on a target book, the target book can serve as a video corresponding to the target video. As an example, the television series "Journey to the West" were made based on the book "Journey to the West". When the target video is the television series "Journey to the West", the book "Journey to the West" is the target book corresponding thereto.

Alternatively, in another possible embodiment, the target video and the target book may comprise the same elements, where the same element may be, e.g., story plot, protagonist name, scene, etc.

In particular, the books corresponding to respective videos may be preset, different plots of the video correspond to different books or to different chapters in the same book, and respective books may correspond to a plurality of videos.

Upon detecting a trigger operation on preview information of the target video, a video play request for the target video may be sent to a server, and the server may determine the target book corresponding to the target video based on a preset correspondence relationship between a book and the video.

The associated sentence may be a voiceover sentence for describing the video content in the target video. In a possible embodiment, the target video comprises a plurality of target segments in non-dialogue scenes, each of which corresponds to a target paragraph. However, an audio corresponding to the target paragraph may be long, for example, the target segment may be only 10 seconds in length, but the audio corresponding to the target paragraph may be 1 minute in length. Then, in this case, if the audio corresponding to the whole target paragraph is directly played, the playing of the audio is likely to continue after the playing of the target segment of the non-dialogue scene is completed because the audio is too long. If so, the audio may be played in the video segment of dialogue scene, which will affect the play effect.

Accordingly, in a possible embodiment, the associated sentence may be a sentence meeting a preset condition, which is extracted from the corresponding paragraph of the target book based on the popularity information corresponding to the respective sentence, wherein the plot of the target segment is the same as that of the target sentence.

Here, the target paragraph generally refers to a non-dialogue paragraph, i.e., a voice-over paragraph. In particular, in the process of reading the target book, users can comment on, give "like" to, and share individual sentences of the target book, or the like. When determining the associated sentence, it can be determined by determining the popularity information of individual sentences in the target paragraph based on the user's interactive operation on the individual sentence of the target paragraph, and then selecting sentences with higher popularity information (i.e., meeting the preset conditions, e.g., having popularity information exceeding a certain value) as the associated sentence. In practice, the step of determining the associated sentence can be previously executed by the server.

When selecting the associated sentence from the target paragraph, the target number of words can be determined by reference to the playing duration of the target segment, and then the associated sentence with the target number of words are selected from the target paragraph. In this way, it can be ensured that the play duration of the audio would not exceed the play duration of the target segment when the audio of the associated sentence is played, thereby avoiding the influence of the audio playing on the video playing.

Because the target segment can be played together with an audio segment, the display effect of the characters' dialogue in a dialogue video segment is likely to be influenced if an audio is played together with the dialogue video segment. Therefore, the target segment of the target video may refer to a non-dialogue video segment; or alternatively, the target segment refers to a segment excluding any character's voice.

When determining the target paragraph corresponding to the target video, it is essentially to determine the target paragraphs corresponding to individual target segments in the target video. In a possible embodiment, it may be performed by matching manually. In another embodiment, the target video may be detected to determine the non-dialogue video segment (i.e., the target segment) in the target video, and then for each video segment, the subtitle information contained in the dialogue video segment in front of and after the video segment (the subtitle information is present because the video segment is a dialogue segment; and if there is not any subtitle information, a subtitle information may be converted from the audio of the dialogue video segment by Speech-to-Text technology) is matched with the text content in the target book to determine the target paragraph corresponding to the respective non-dialogue video segments (i.e., the target segment) based on the matching results.

As an example, if the target video comprises a dialogue video segment 1—a non-dialogue video segment A—a dialogue video segment 2, when determining the target paragraph corresponding to the non-dialogue video segment A, the subtitle information contained in the dialogue video segment 1 and the dialogue video segment 2 can be recognized, respectively, and the target paragraph corresponding to the non-dialogue video segment A may be determined by matching the recognized subtitle information with the target book.

As an example, when detecting the target video to determine the non-dialogue video segment (i.e., the target segment) in the target video, a segment composed of consecutive multiple video frames (a preset number of frames) without subtitle may be taken as the target segment; or a video segment which does not containing a dialogue audio in a preset duration may be taken as the target segment.

After determining the individual target segments of the target video, and selecting the associated sentence from the target paragraph corresponding to various target segment, in a possible embodiment, the playing timestamps of the individual target segments may be acquired when acquiring the target video; and then it may be determined which target segment is being played based on the playing timestamp in the process of playing the target video; and then it can be determined which associated sentence audio should be played based on the correspondence relationship between the target segment and the associated sentence upon triggering the audio identification.

In another possible embodiment, an anchor may be set in the target video based on the playing process of the individual target segments in the target video; and it can be determined that the target segment of the target video is being played upon triggering the anchor in the process of playing the target video.

Figure 2A:
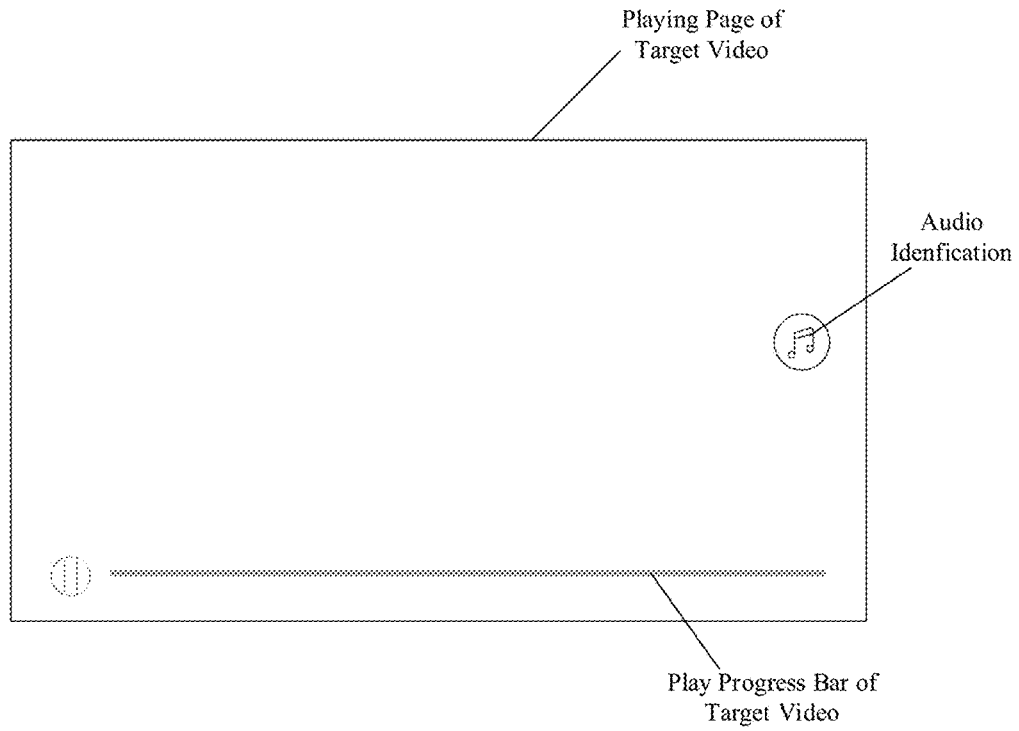
FIG. 2a shows a schematic display view of an audio identification in the video display method provided in an embodiment of the present disclosure.

An example of the audio identification may be an audio play button, and an exemplary display effect thereof is as shown in FIG. 2a. In practice, to avoid affecting the display effect of the target video, the audio identification may be displayed during playing the target segment and disappear after the end of the target segment.

In a possible embodiment, the target book may have a corresponding book audio (e.g., which may be obtained by a Text to Speech (TTS) technology), and after determining the target association corresponding to the target video, the audio that is expected to correspond to the association in the book audio may be determined based on the display process of the target association in the target book; or alternatively, the audio of the associated sentence may be synthesized directly based on the TTS technology.

In another possible embodiment, the associated sentence may further comprise comment information of the target paragraph, where acquiring the audio of the associated sentence may comprise acquiring an audio of the comment information conversed by server.

As an example, if the comment information of the target paragraph is "ha-ha-ha-ha it is so funny", a corresponding audio may be generated based on the text content of "ha-ha-ha-ha it is so funny", and when the target segment corresponding to the target paragraph is played, the audio corresponding to "ha-ha-ha-ha it is so funny" is played upon triggering the audio identification.

Here, there may be much comment information. In a possible embodiment, target comment information may be selected based on the popularity information of the individual comment information, and an audio of the target comment information is acquired when acquiring an audio of the associated sentence at the user side. If there are multiple pieces of target comment information, audios of the multiple pieces of individual target information may be sequentially played based on the popularity information upon triggering the audio identification.

In a possible embodiment, the text content corresponding to the target sentence may be displayed at a preset location while playing the target segment. As an example, since the target segment is a non-dialogue video segment and the target segment does not generally comprise a subtitle, the text content corresponding to the target sentence may be displayed in the location area for displaying the subtitle.

In particular, when displaying the text content of the target sentence, the text content may be displayed at the same of playing the target sentence upon triggering the audio identification.

Here, the target sentence may comprise a plurality of sentences, and the text content may match the played target sentence when displaying the text content. That is, when playing an audio of any one sentence, the text content of the sentence is displayed.

Alternatively, in another possible embodiment, when displaying the text content corresponding to the target sentence, a floating layer may be superimposed at a preset location, and the text content is displayed on the floating layer. When the amount of text contents is large, they may be scrollably displayed along with the played audio. When playing an audio of any sentence, the displayed text content of the sentence may be highlighted (e.g., changing the color, bolding, and etc.)

In a possible embodiment, users can also trigger the displayed text content, the user terminal can determine the display progress of the text content in the target book in response to the triggering operation on the text content, and skip to display the target book in accordance with the display progress.

Here, because the target video may be played on a video player application, when skipping to display the target book, as an example, a book reading program can be automatically run upon acquiring the user's authorization, and the target book is displayed on the book reading program in accordance with the display progress.

Here, it is to indicated that the target book is generally stored in a database of the book reading program.

If the target book is not stored in the database of the book reading program, in a possible embodiment, a search request can be initiated in the browser based on the book information of the target book, and the search results corresponding to the search request is acquired and displayed; or alternatively, the associated book corresponding to the target book can be determined, and the pre-view information of the associated book can be displayed on the book reading program.

Here, for example, the associated book corresponding to the target book may be a book with the same type, or a book with the same author, and the like.

In a possible embodiment, it is also feasible to acquire target comment information corresponding to the target sentence from the comment information corresponding to the target book, and then display the target comment information in manner of bullet comments while playing the target segment.

Here, when the number of pieces of comment information corresponding to the target sentence is small (e.g., the number of pieces of the comment information is smaller than a first preset value), all the comment information of the target sentence may be taken as the target comment information and be displayed in manner of bullet comments. When the number of pieces of the comment information corresponding to the target sentence is large (e.g., the number of pieces of the comment information is not smaller than the first preset value), the comment information with popularity information meeting the preset popularity conditions may be selected as the target comment information based on the popularity information of the individual comment information (e.g., which can be determined by the number of giving "like", the number of replies, and the like).

In a possible embodiment, it is also feasible to acquire a topic information involving the target book and determine a first video segment with popularity information meeting preset conditions of the target video. When the first video segment of the target video is played, the topic information may be displayed.

Here, the topic information may include, for example, at least one of the content of the topic, the title of the topic and the comments to the topic, and etc.

The topic information involving the target book may refer to a topic information having corresponding book list involving the target book; or a topic information having corresponding comments involving the target book. The book list corresponding to the topic information may be determined based on the book information carried by the comments on the topic information.

Here, when displaying the topic information, for example, the topic information may be displayed as bullet comments, or displayed in a preset location area of the screen interface for a fixed duration of time.

When determining the first video segment which has popularity information meeting the preset conditions in the target video, as an example, the target video may be divided into a plurality of video segments (e.g., divided by plots, by scenes, and etc.) in advance, and then the popularity information of the individual video segments is determined, respectively, and the first video segment which meets the preset conditions is selected based on the popularity information.

Here, the popularity information of the individual video segments may be determined, for example, based on at least one of the number of bullet comments corresponding to the individual video segments, the number of on-line viewers, the number of full-screen viewers, the number of exit viewers, and the like.

In a possible embodiment, the target book may have a corresponding book circle, e.g., a book circle for the book, a book circle for the plot in the book, a book circle for the characters in the book, and the like. For example, for the book "Journey to the West", there may be a book circle for the book "Journey to the West", or a book circle corresponding to the story plot "Monkey King Sun Wukong Defeating the White Bone Demon Thrice", or a book circle corresponding to the book character "Monkey King Sun Wukong".

In a possible embodiment, it is also feasible to acquire at least a piece of book circle information (e.g., name of the book circle). Then, the book circle information may be summarized during the process of playing the target video, and when detecting that the target video meets the display conditions of any book circle information, the book circle information may be displayed.

Here, the display conditions of the book circle information may be set as different display conditions based on different book circle information. For example, as to the book circle information for the book, the display condition of the book circle information may be that the hottest video segment of the target video is being played; as to the book circle for the plot in the book, the display condition may be that the plot segment corresponding to the plot of the target video is being played; and as to the book circle for a character in the book, the display condition may be that the character corresponding to the book circle for character in the book appears for the first time in the video.

In a possible embodiment, upon displaying any book circle information, it is also feasible to skip to display a book circle corresponding to a triggered book circle information in response to the triggering operation on the displayed book circle information.

In a possible embodiment, when playing the target video, the target video may be played on a target page.

Prior to playing of the target video in full screen on the target page, a video identification of the target video (e.g., pre-view information of the target video) and a plurality of other video identifications associated with the target video (e.g., pre-view information of other videos in a video collection) may be displayed at a first preset location on the target page. And, a book identification or a book chapter identification associated with a video corresponding to the video identification may be displayed at a respective location of each video identification on the target page.

In addition, prior to playing the target video in full screen on the target page, multiple pieces of comment information may be displayed at a second preset location on the target page, which may include comment information of the target video and/or the target book.

Figure 2B:
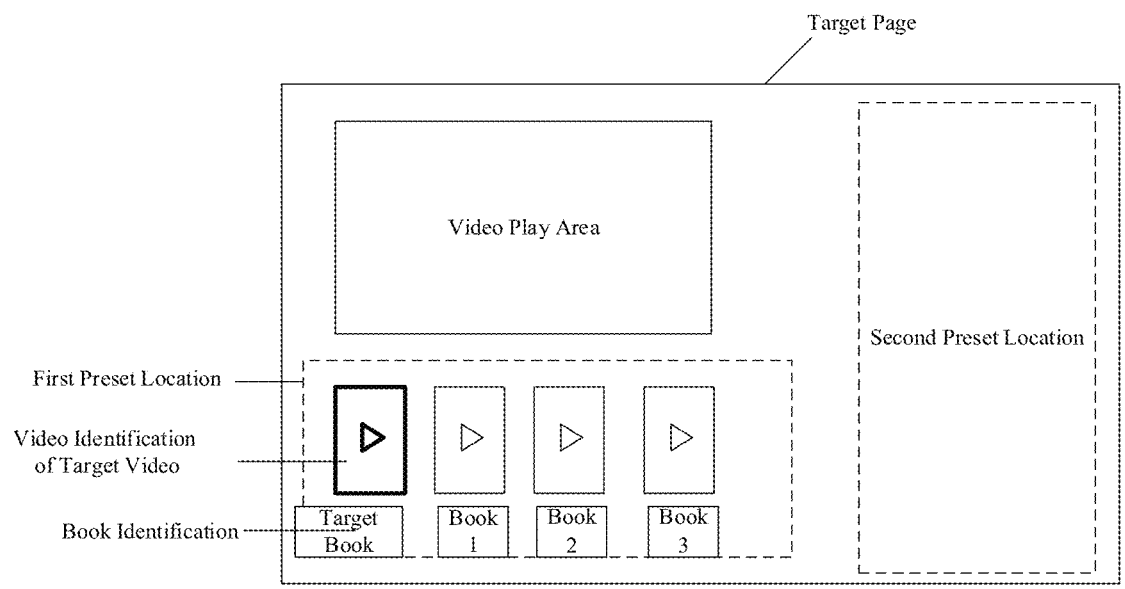
FIG. 2b shows a schematic display view of a target page in the video display method provided in an embodiment of the present disclosure.

A schematic view of an exemplary display effect of the target page is shown in FIG. 2b.

It can be understood for those skilled in the art that in the above-mentioned method according to the embodiments, the implementation process is not limited to the described specific order of various steps, and the execution order of various steps should be determined according to their functions and possible internal logic.

Based on the same invention concept, embodiments of the present disclosure further provide a video display apparatus corresponding to the video display method. Because the principle of the apparatus in the embodiments of the present disclosure is similar to that of the video display method in the embodiments of the present disclosure, the implementation of the apparatus may refer to that of the method, and the duplicate content will not be reiterated.

Figure 3:
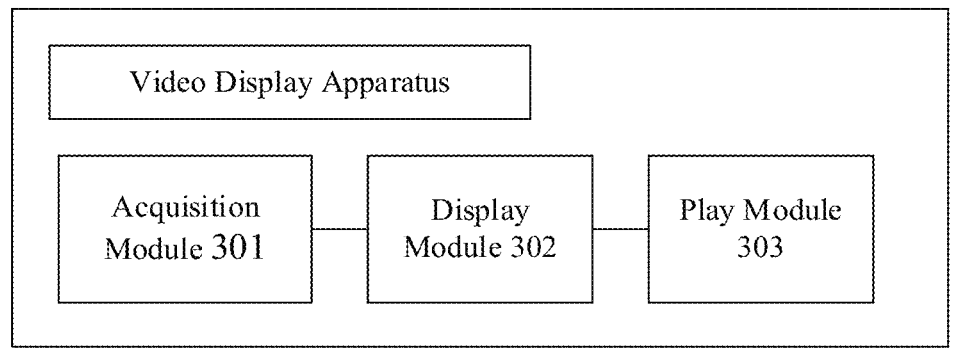
FIG. 3 shows a schematic structural view of a video display apparatus provided in an embodiment of the present disclosure.

Referring to FIG. 3, a schematic structural view of the video display apparatus provided in the embodiments of the present disclosure is illustrated, in which the video display apparatus includes: an acquisition module 301, a display module 302, and a play module 303.

The acquisition module 301 is configured to acquire a target video and audios of associated sentences corresponding to the target video in response to a video play request for the target video. The associated sentences are extracted from a target book corresponding to the target video.

The display module 302 is configured to play the target video and display an audio identification when a target segment of the target video is being played.

The play module 303 is configured to determine a target sentence corresponding to the target segment from the associated sentences in response to a trigger operation on the audio identification and play an audio of the target sentence at the same time when the target segment is being played.

In a possible embodiment, the display module 302 is further configured as follows.

The display module 302 is further configured to acquire target comment information corresponding to the target sentence from comment information corresponding to the target book.

The display module 302 is further configured to display the target comment information in manner of bullet comments at the same time when the target segment is being played.

In a possible embodiment, the display module 302 is further configured as follows.

The display module 302 is further configured to display the text content corresponding to the target sentence at the same time when the target segment is being played.

In a possible embodiment, the play module 303 is further configured as follows.

The play module 303 is further configured to determine a display progress of the text content in the target book in response to a trigger operation on the text content.

The play module 303 is further configured to skip to display the target book in accordance with the display progress.

In a possible embodiment, the associated sentence is a sentence with popularity information meeting preset conditions, which is extracted from the corresponding paragraph of the target book in accordance with the popularity information corresponding to the respective sentence, wherein the target segment has the same plot as that of the target sentence.

In a possible embodiment, the play module 303 is further configured to:
 acquire a topic information involving the target book;
 determine a first video segment with popularity information meeting a preset condition in the target video; and
 display the topic information while playing the first video segment in the target video.

In a possible embodiment, the display module 302 is further configured to:
 acquire at least one piece of book circle information corresponding to the target book;
 display the book circle information when the target video is detected to meet display conditions of any book circle information during the process of playing the target video; and
 skip to display a book circle corresponding to the triggered book circle information in response to a trigger operation on the displayed book circle information.

In a possible embodiment, when playing the target video, the play module 303 is configured to:
 play the target video on a target page; and
 the display module 302 is further configured to:
 display, prior to full screen playing of the target video on the target page, a video identification of the target video at a first preset location on the target page and a plurality of other video identifications associated with the target video, and display a book identification or a book chapter identification associated with a video corresponding to the video identification at a respective location of each video identification on the target page.

The description of the processing procedure and the interaction procedure of various modules in the apparatus may refer to the related description in the above embodiments of method, which are not here reiterated in details.

Figure 4:
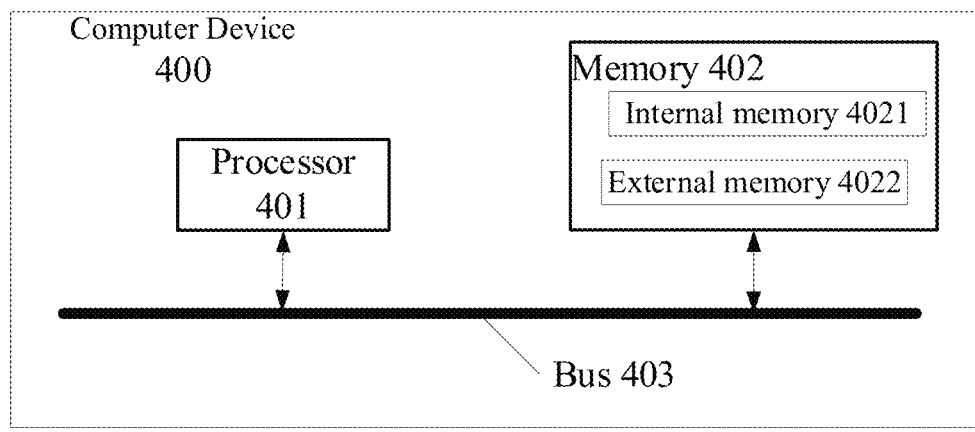
FIG. 4 shows a schematic structural view of a computer device provided in an embodiment of the present disclosure.

Based on the same technical concept, embodiments the present disclosure further provides a computer device. Referring to FIG. 4, it shows a schematic structural view of a computer device 400 provided in the embodiments of the present disclosure, comprising: a processor 401, a memory 402, and a bus 403. Among them, the memory 402 is used to store executable instructions and includes an internal memory 4021 and an external memory 4022; where the internal memory 4021 is also called internal storage and used to temporarily store the operational data in the processor 401 and the date exchanged with the external memory 4022 such as a hard disc. The processor 401 exchanges data via the internal memory 4021 with the external memory 4022. When the computer device 400 operates, the processor 401 communicates via the bus 403 with the memory 402 to allow the processor 401 to execute the instructions to:
 acquire the target video and audios of associated sentences corresponding to the target video in response to the video play request for the target video; wherein the associated sentences are extracted from a target book corresponding to the target video;
 play the target video, and display the audio identification when the target segment of the target video is being played; and
 determine a target sentence corresponding to the target segment from the associated sentences in response to a trigger operation on the audio identification, and play an audio of the target sentence at the same time when the target segment is being played.

In a possible embodiment, when the instructions are executed by the processor 401, the processor is further caused to:
 acquire target comment information corresponding to the target sentence from comment information corresponding to the target book; and
 display the target comment information in manner of bullet comments at the same time when the target segment is being played.

In a possible embodiment, when the instructions are executed by the processor 401, the processor is further caused to:
 display the text content corresponding to the target sentence at the same time when the target segment is being played.

In a possible embodiment, when the instructions are executed by the processor 401, the processor is further caused to:
 determine a display progress of the text content in the target book in response to a trigger operation on the text content; and
 skip to display the target book in accordance with the display progress.

In a possible embodiment, when the instructions are executed by the processor 401, the associated sentence is a sentence with popularity information meeting preset conditions, which is extracted from the corresponding paragraph of the target book in accordance with the popularity information corresponding to the respective sentence, wherein the target segment has the same plot as that of the target sentence.

In a possible embodiment, when the instructions are executed by the processor 401, the processor is further caused to:
acquire a topic information involving the target book;
determine a first video segment with popularity information meeting a preset condition in the target video; and
display the topic information while playing the first video segment in the target video.

In a possible embodiment, when the instructions are executed by the processor 401, the processor is further caused to:
acquire at least a book circle information corresponding to the target book;
display the book circle information when the target video is detected to meet display conditions of any book circle information during the process of playing the target video; and
skip to display a book circle corresponding to the triggered book circle information in response to a trigger operation on the displayed book circle information.

In a possible embodiment, when the instructions are executed by the processor 401, the playing the target video comprises:
playing the target video on a target page; and
the processor is further caused to:
display, prior to full screen playing of the target video on the target page, a video identification of the target video at a first preset location on the target page and a plurality of other video identifications associated with the target video, and display a book identification or a book chapter identification associated with a video corresponding to the video identification at a respective location of each video identification on the target page.

Embodiments of the present disclosure further provides a computer-readable storage medium storing a computer program, and the processor executes the steps of the video display method described in the above method embodiments when the computer program is executed by the processor. The storage medium may be a volatile or a non-volatile computer-readable storage medium.

Embodiments of the present disclosure further provides a computer program product with program codes stored thereon, and the program codes include instructions that may be executed to perform the steps of the video display method described in the above method embodiments. Details refer to the above method embodiments, which are not reiterated here.

Among others, the above computer program product may be realized by means of hardware, software, or combinations thereof. In an alternative embodiment, the computer program product is embodied as a computer storage medium; and in another alternative embodiment, the computer program product is embodied as a software product, such as, a software development kit (SDK), or the like.

It can be clearly understood by those skilled in the art that for the convenience and conciseness of description, the specific working procedure of the system and device described above may refer to the corresponding procedure in the aforementioned method embodiments, and thus are not be reiterated here. In several embodiments provided in the present disclosure, it should be understood that the disclosed system, apparatus and method may be embodied by other means. The device embodiments described above are only schematic. For example, the division of the units is only a division method according to the logical function, and there may be other division methods in practical implementation. For example, multiple units or components may be combined or integrated into another system, or some features may be omitted or not performed. On the other hand, the mutual coupling or direct coupling or communication connection as shown or discussed can be indirect coupling or communication connection via some communication interfaces, devices or units, which can be in electrical, mechanical or other forms.

The units described as separate components can be physically separated or not physically separated, and the components displayed as units can be physical units or not physical units, that is, they can be located in one place or distributed in multiple network units. Some or all of the units can be selected according to practical requirements to achieve the objectives of the embodiments.

In addition, various functional units in various embodiments of the present disclosure can be integrated into one processing unit; or alternatively, various units can be physically separated, or two or more units can be integrated into one unit.

If the functions are realized in form of software functional units and sold or used as separate products, they can be stored in a processor-executable non-volatile computer-readable storage medium. Based on the above understanding, the technical solution of the present disclosure, or the portion contributing to the prior art, or a portion of the technical solution can be embodied in form of software product stored in a storage medium, on which several instructions are stored to allow a computer device (which can be a personal computer, a server, a network device, etc.) to execute all or some of the steps of the method described in various embodiments of the present disclosure. The aforementioned storage medium includes various kinds of media that can be used for storing program codes, such as, U disk, mobile hard disk, read-only memory (ROM), random access memory (RAM), magnetic disk or optical disk.

Finally, it should be indicated that the above embodiments are only specific embodiments of the disclosure for illustrating, instead of restricting, the technical scheme of the disclosure, and the protection scope of the disclosure is not limited thereto. Although the disclosure has been described in detail with reference to the above embodiments, it should be understood for those of ordinary skills in the art that any person familiar with the technical field can still modify or easily think of variations to the technical solutions recorded in the above embodiments within the technical scope of the disclosure, or make equivalent substitution to some of the technical features, and these modifications, variations or substitutions would not make the nature of the corresponding technical solution depart from the spirit and scope of the technical solutions of the embodiment of the present disclosure, and should be encompassed in the protection scope of the present disclosure.

Therefore, the scope of protection of this disclosure should be based on the scope of protection of the claims. Therefore, the protection scope of the present disclosure is defined by the appended claims.

What is claimed is:
1. A video display method, comprising:
acquiring a target video and audios of associated sentences corresponding to the target video in response to a video play request for the target video; wherein the associated sentences are extracted from a target book corresponding to the target video;

playing the target video and displaying an audio identification when a target segment of the target video is being played;

determining a target sentence corresponding to the target segment from the associated sentences in response to a trigger operation on the audio identification, and playing an audio of the target sentence while playing the target segment; displaying a text content corresponding to the target sentence at a preset location while playing the target segment;

determining a display progress of the text content in the target book in response to a trigger operation on the text content; and skipping to display the target book in accordance with the display progress; and wherein the target video is different from text of the target book, and the target video is filmed based on the target book; and wherein when the associated sentence is selected from a target paragraph in the target book, a target number of words is determined based on a playing duration of the target segment, and the associated sentence with the target number of words is selected from the target paragraph.

2. The method according to claim 1, further comprising:
acquiring target comment information corresponding to the target sentence from comment information corresponding to the target book; and
displaying the target comment information in manner of bullet comments while playing the target segment.

3. The method according to claim 1, wherein the associated sentence is one with popularity information meeting preset conditions, which is extracted from a corresponding paragraph of the target book in accordance with popularity information corresponding to respective sentences, wherein the target segment has a same plot as that of the target sentence.

4. The method according to claim 1, further comprising:
acquiring a topic information involving the target book;
determining a first video segment with popularity information meeting a preset condition in the target video; and
displaying the topic information while playing the first video segment in the target video.

5. The method according to claim 1, further comprising:
acquiring at least one book circle information corresponding to the target book;
when the target video is detected to meet display conditions for any book circle information in process of playing the target video, displaying the book circle information; and
skipping to display a book circle corresponding to the triggered book circle information in response to a trigger operation on the displayed book circle information.

6. The method according to claim 1, wherein the playing the target video comprises:
playing the target video on a target page; and
the method further comprises:
prior to full screen playing of the target video on the target page, displaying a video identification of the target video at a first preset location on the target page and a plurality of other video identifications associated with the target video, and displaying a book identification or a book chapter identification associated with a video corresponding to the video identification at a respective location of each video identification on the target page.

7. A non-transitory computer-readable storage medium, wherein the computer-readable storage medium is stored as one or more computer programs, and the steps of the video display method of claim 1 are executed when the one or more computer programs are executed by at least one processor.

8. A video display apparatus, comprising:
an acquisition module for acquiring a target video and audios of associated sentences corresponding to the target video in response to a video play request for the target video; wherein the associated sentences are extracted from a target book corresponding to the target video;
a display module for playing the target video and displaying an audio identification when a target segment of the target video is being played; and
a play module for determining a target sentence corresponding to the target segment from the associated sentences in response to a trigger operation on the audio identification, and playing an audio of the target sentence while playing the target segment;
wherein the display module is further configured for:
displaying a text content corresponding to the target sentence at a preset location while playing the target segment;
determining a display progress of the text content in the target book in response to a trigger operation on the text content; and
skipping to display the target book in accordance with the display progress; and
wherein the target video is different from text of the target book, and the target video is filmed based on the target book; and
wherein when the associated sentence is selected from a target paragraph in the target book, a target number of words is determined based on a playing duration of the target segment, and the associated sentence with the target number of words is selected from the target paragraph.

9. The apparatus according to claim 8, wherein the display module is further configured for:
acquiring target comment information corresponding to the target sentence from comment information corresponding to the target book; and
displaying the target comment information in manner of bullet comments while playing the target segment.

10. The apparatus according to claim 8, wherein the associated sentence is one with popularity information meeting preset conditions, which is extracted from a corresponding paragraph of the target book in accordance with popularity information corresponding to respective sentences, wherein the target segment has a same plot as that of the target sentence.

11. The apparatus according to claim 8, the display module is further configured for:
acquiring a topic information involving the target book;
determining a first video segment with popularity information meeting a preset condition in the target video; and
displaying the topic information while playing the first video segment in the target video.

12. The apparatus according to claim 8, the display module is further configured for:
acquiring at least one book circle information corresponding to the target book;

when the target video is detected to meet display conditions for any book circle information in process of playing the target video, displaying the book circle information; and skipping to display a book circle corresponding to the triggered book circle information in response to a trigger operation on the displayed book circle information.

13. The apparatus according to claim 8, wherein the play module is further configured for: playing the target video on a target page; and wherein the display module is further configured for: prior to full screen playing of the target video on the target page, displaying a video identification of the target video at a first preset location on the target page and a plurality of other video identifications associated with the target video, and displaying a book identification or a book chapter identification associated with a video corresponding to the video identification at a respective location of each video identification on the target page.

14. A computer device, comprising:

a processor, a memory and a bus, wherein the memory is stored with machine-readable instructions which are executable by the processor, the processor communicates with the memory via the bus when the computer device works, and when the machine-readable instructions are executed by the processor, the computer device is caused to:

acquire a target video and audios of associated sentences corresponding to the target video in response to a video play request for the target video, wherein the associated sentences are extracted from a target book corresponding to the target video;

play the target video and displaying an audio identification when a target segment of the target video is being played;

determine a target sentence corresponding to the target segment from the associated sentences in response to a trigger operation on the audio identification, and play an audio of the target sentence while playing the target segment;

display a text content corresponding to the target sentence at a preset location while playing the target segment;

determine a display progress of the text content in the target book in response to a trigger operation on the text content; and skip to display the target book in accordance with the display progress; and wherein the target video is different from text of the target book, and the target video is filmed based on the target book; and wherein when the associated sentence is selected from a target paragraph in the target book, a target number of words is determined based on a playing duration of the target segment, and the associated sentence with the target number of words is selected from the target paragraph.

15. The computer device according to claim 14, wherein the computer device is further caused to:

acquire target comment information corresponding to the target sentence from comment information corresponding to the target book; and display the target comment information in manner of bullet comments while playing the target segment.

* * * * *